(12) United States Patent
Murakami et al.

(10) Patent No.: US 11,965,130 B2
(45) Date of Patent: Apr. 23, 2024

(54) BOREHOLE CEMENT SLURRY ADDITIVE, METHOD FOR STORING SAME, BOREHOLE CEMENT SLURRY, AND BOREHOLE CEMENTING METHOD

(71) Applicant: Nissan Chemical Corporation, Tokyo (JP)

(72) Inventors: Satoru Murakami, Sodegaura (JP); Masaki Kimata, Sodegaura (JP); Isao Oota, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 104 days.

(21) Appl. No.: 17/603,287

(22) PCT Filed: Apr. 7, 2020

(86) PCT No.: PCT/JP2020/015632
§ 371 (c)(1),
(2) Date: Oct. 12, 2021

(87) PCT Pub. No.: WO2020/217967
PCT Pub. Date: Oct. 29, 2020

(65) Prior Publication Data
US 2022/0195282 A1 Jun. 23, 2022

(30) Foreign Application Priority Data
Apr. 25, 2019 (JP) .................. 2019-083644

(51) Int. Cl.
*C09K 8/467* (2006.01)
*C04B 22/06* (2006.01)
*C04B 24/02* (2006.01)
*C04B 28/02* (2006.01)
*C04B 103/24* (2006.01)

(52) U.S. Cl.
CPC .............. *C09K 8/467* (2013.01); *C04B 22/06* (2013.01); *C04B 24/02* (2013.01); *C04B 28/02* (2013.01); *C04B 2103/24* (2013.01)

(58) Field of Classification Search
CPC ......... C09K 8/467; C04B 22/06; C04B 24/02; C04B 28/02; C04B 2103/24
See application file for complete search history.

(56) References Cited

U.S. PATENT DOCUMENTS

| | | | |
|---|---|---|---|
| 5,028,270 | A | 7/1991 | Förster et al. |
| 5,149,370 | A | 9/1992 | Olaussen et al. |
| 2011/0054067 | A1 | 3/2011 | Lewis et al. |
| 2016/0160109 | A1 | 6/2016 | Patil et al. |

FOREIGN PATENT DOCUMENTS

| | | | |
|---|---|---|---|
| CN | 102604611 A | * | 7/2012 |
| CN | 105347716 A | | 2/2016 |
| CN | 105567192 A | | 5/2016 |
| JP | 59-179579 A | | 10/1984 |
| JP | 2-9707 A | | 1/1990 |
| JP | 4146719 B2 | | 9/2008 |
| JP | 5693187 B2 | | 4/2015 |
| WO | WO 01/98227 A1 | | 12/2001 |

OTHER PUBLICATIONS

Office Action dated Apr. 21, 2022, in Chinese Patent Application No. 202080030675.4.
International Search Report for PCT/JP2020/015632 (PCT/ISA/210) dated Jun. 30, 2020.
Toshiyuki Takahashi, "Journal of the Society of Inorganic Materials, Japan", vol. 14, 2007, pp. 464-469.
Written Opinion of the International Searching Authority dated Jun. 30, 2020, in PCT/JP2020/015632.

* cited by examiner

*Primary Examiner* — Crystal J Lee
(74) *Attorney, Agent, or Firm* — Birch, Stewart, Kolasch & Birch, LLP

(57) ABSTRACT

A borehole cement slurry additive that is capable of suppressing the generation of free water from cement slurries in any environment, whether cold regions, mild regions, or hot regions; and a method for storing the same. The borehole cement slurry additive contains: an aqueous dispersion of silica having an average particle size of 3-200 nm as determined via dynamic light scattering; and a compound having an alcoholic hydroxyl group as a dispersion stabilizer, the compound being included in an amount of 1-30 mol per 1,000 g dispersion medium in the aqueous silica dispersion.

11 Claims, No Drawings

BOREHOLE CEMENT SLURRY ADDITIVE, METHOD FOR STORING SAME, BOREHOLE CEMENT SLURRY, AND BOREHOLE CEMENTING METHOD

TECHNICAL FIELD

The present invention relates to an additive for cement slurry for a well and a method for storing the same, cement slurry for a well, and a cementing method for a well.

BACKGROUND ART

As for cement slurry for cementing for use in field well boring for oil fields and gas oil fields in cold regions such as North America or Northern Europe, there is a growing demand for cement slurry for cementing that suppresses the occurrence of free water and achieves excellent fluidity and strength. Thus, an additive for cement slurry that meets the demand is desired. Also, in high-temperature regions such as Middle and Near East, there is a growing demand for cement slurry for cementing that suppresses the occurrence of free water and achieves excellent fluidity and strength. Thus, an additive for cement slurry that meets the demand is desired. There is a growing demand for a global additive for cement slurry that can be used in both cold regions and high-temperature regions rather than an additive for cement slurry that must be used differently between cold regions and high-temperature regions.

The cementing refers to the application of cement slurry prepared from cement and water or dissolution water containing an additive to various locations within a well or to the inside or outside of a casing.

In cement slurry for cementing, there is a suggestion that aqueous silica sol having a particle size on the order of 3 to 20 nm or a polymer such as ABS resin (acrylonitrile-butadiene-styrene copolymer resin) or ASA resin (acrylonitrile-styrene-acrylate copolymer resin) is used as an additive that suppresses free water from cement slurry.

For example, as the suggested attempt to suppress the occurrence of free water from cement slurry by the addition of colloidal silica (silica sol), Patent Document 1 discloses cement slurry supplemented with approximately 1 to approximately 30% (with respect to the dry weight of cement) colloidal silica having a specific surface area of approximately 50 m$^2$/g to 1000 m$^2$/g. As disclosed therein, the slurry had 0% to 3.2% free water after conditioning at 25 to 91° C. (curing at the predetermined temperature).

Patent Document 2 discloses a building material (roads, tunnels, bridges, buildings, well cement fixation, etc.) containing a hydraulic binder, water and aluminum-modified colloid silica containing 0.05 to 3 wt % Al$_2$O$_3$. This document discloses that cement slurry containing aluminum-modified colloid silica having a specific surface area of 80 to 900 m$^2$/g was slurry that had favorable fluidity and contained substantially no free water (however, temperature conditions are not disclosed).

Non Patent Document 1 states that as the number of cases of horizontally boring a production layer is increasing, colloidal silica having a particle size of 0.05 μm and a specific surface area of 500 m$^2$/g was added (specific weight of cement slurry: 1.89) to class G cement to perform actual operation at a horizontal portion (length: approximately 1500 m), as measures for improving the replacement efficiency of boring mud with cement slurry and reducing material segregation (including a free liquid) in the slurry at the time of the horizontal boring of a production layer.

As for redispersibility after freezing and thawing of aqueous silica sol, Patent Document 3 discloses that silicic acid sol supplemented with glycol such as monoethylene glycol or primary, secondary or tertiary amine as an anti-freezing agent for silicic acid sol (particularly, silica sol) is still stable after a freezing and thawing test conducted several times.

Patent Document 4 discloses a water dispersion of a fine silica-type inorganic oxide particle, the water dispersion comprising a silica-type inorganic oxide particle having an average particle size of 1 to 500 nm, and one or more alcohols selected from methyl alcohol, ethyl alcohol and isopropyl alcohol, wherein a concentration of the alcohol falls within a range of 0.5 to 8% by weight, and a solid concentration of the fine silica-type inorganic oxide particle contained in the water dispersion falls within a range of 0.001 to 60% by weight. Example 1 to Example 3 disclose that when a water dispersion of a fine silica particle containing 3% by weight of ethyl alcohol in 40 g of silica sol containing a fine silica particle (average particle size: 10.6 nm, SiO$_2$ concentration: 30.3% by weight, dispersion medium: water) was frozen at −2° C. and then thawed at normal temperature, the fine silica particle was readily dispersed to obtain a water dispersion having almost the same average particle size as that before the freezing; thus, water dispersion of a fine silica-type inorganic oxide particle is excellent in redispersibility of freezing and thawing.

In the case of suppressing the occurrence of free water from cement slurry for cementing, the air temperature often falls much below 0° C. in oil fields and gas oil fields in cold areas such as North America and Northern Europe, and the polymer such as ABS resin or ASA resin as described above becomes fragile and easily broken due to vitrification during transportation and preservation in the environments of the cold areas at, for example, −5 to 20° C. or lower. Hence, its effect of suppressing the occurrence of free water from cement slurry for cementing might be drastically reduced.

In both Patent Document 2 and Non Patent Document 1, use of aqueous silica sol is readily presumed. For example, silica sol aggregates largely even if frozen during transportation and preservation in the environments of the cold areas at, for example, −5 to 20° C. or lower, and furthermore thawed. Therefore, its effect of suppressing the occurrence of free water from cement slurry for cementing might almost disappear.

Accordingly, it is possible to add a dispersion stabilizer having a freezing point lowering function in order to prevent the freezing of aqueous silica sol.

A freezing point depression temperature after addition of the dispersion stabilizer having a freezing point lowering function to water can be determined from the molecular weight and molarity of the dispersion stabilizer on the basis of a formula that connects freezing point depression to the molarity of the dispersion stabilizer per 1000 g of water.

Relatively inexpensive calcium chloride, sodium chloride and urea are widely used as dispersion stabilizers having a freezing point lowering function for water. These dispersion stabilizers are not preferred for aqueous silica sol because addition thereof into the aqueous silica sol causes aggregation or gelling of the silica sol.

Use of non-freezable silica sol thus obtained by the addition of the dispersion stabilizer having a freezing point lowering function to aqueous silica sol, in the suppression of the occurrence of free water in cement slurry for use in cementing has not yet been disclosed.

As for aqueous silica sol having favorable redispersibility after freezing and thawing, the antifreezing silicic acid sol described in Patent Document 4 is intended for dental techniques and thus differs in purpose. Patent Document 5 does not state that the water dispersion of a fine silica-type inorganic oxide particle is used in the suppression of the occurrence of free water in cement slurry for use in cementing.

Patent Document 5 describes a method of adding ethylene glycol to liquid glass for injection to the ground and also states that this method has the disadvantages of slow gelling and subsequent reaction and shrinkage after work. Hence, Patent Document 5 describes inhibitory factors as to the addition of ethylene glycol to cement for a well.

A cementing method may be performed by the addition of an additive for cement slurry for a well comprising aqueous silica sol containing a dispersion stabilizer that stably disperses a silica particle having an average particle size of 3 to 200 nm within a range of −30° C. to +60° C. In well boring for oil fields, gas fields and the like in cold regions, cementing work of injecting cement slurry to a gap (also referred to as an annular gap: annulus, etc.) between a casing pipe and the stratum (wall) is carried out in order to fix or reinforce the casing pipe inserted as an inner frame in the well, to prevent corrosion, and to prevent the flow of groundwater into the well, in finishing the well.

In the well boring for oil fields, gas fields and the like, boring work using a bit (drilling tool) and the cementing work described above are repetitively carried out, and both the temperature and pressure of a site of work are elevated with increase in the depth of an oil well. In recent years, the frequency of horizontal wells has been increased which can increase the amount of production by horizontally burrowing the production layers of oil field and gas oil field layers. Unlike conventional vertical wells or inclined wells, the horizontal wells require paying attention to mud water nature during boring or the design of cement slurry for use in cementing.

Cement slurry for cementing is designed according to the well conditions as mentioned above, and prepared by the addition of cement and water as well as additives such as a cement hardening accelerator, a cement hardening retarder, a light-weight aggregate, a heavy-weight aggregate, a cement dispersant, a cement dehydration regulator, a cement strength stabilizer, and a lost circulation material.

Cement for a well (also referred to as oil well cement, geothermal well cement, or the like) for use in cementing has required performance different from that of cement for ordinary structures and is required to possess, for example, workability such as slurry fluidity or strength exertion, and durability even at a high temperature and pressure.

Various types of oil well cement are defined on the basis of class or sulfate resistance according to the API specification (specification regarding petroleum stipulated by the American Petroleum Institute) as a specification that takes such required performance into consideration. Among others, class G cement is cement most commonly used for oil well boring.

PRIOR ART DOCUMENTS

Patent Document

Patent Document 1: U.S. Pat. No. 5,149,370
Patent Document 2: Japanese Patent No. 4146719
Patent Document 3: JP 2-9707 A
Patent Document 4: Japanese Patent No. 5693187
Patent Document 5: JP 59-179579 A Non Patent Document Non Patent Document 1: Journal of the Society of Inorganic Materials, Japan, Vol. 14, 2007, p. 464

SUMMARY OF INVENTION

Technical Problem

However, even if the API specification described above is satisfied, the amount of free water generated from cement slurry is disadvantageously increased in the environments of cold regions, resulting in impaired fluidity of the cement slurry or cement strength. Thus, there is a demand for an approach that can suppress the occurrence of free water even in the well environments described above.

The present invention has been made in light of these circumstances. An object of the present invention is directed to an additive that is blended into cement slurry for cementing (for a well), for example, in oil fields and gas oil fields, and is to provide an additive for cement slurry for a well which can suppress the occurrence of free water from cement slurry in any environment of cold regions, warm regions and high-temperature regions, and a method for storing the same. Another object of the present invention is to provide cement slurry for a well, comprising the additive described above.

A further object of the present invention is to provide a cementing method for a well using the cement slurry for a well described above.

Solution to Problem

The present inventors have conducted diligent studies on the objects and consequently completed the present invention by finding that: an additive which is a composition comprising an aqueous dispersion of silica and comprising a specific amount of a compound having an alcoholic hydroxyl group as a dispersion stabilizer with respect to a dispersion medium in the aqueous dispersion of silica, more preferably a composition produced under specific conditions and/or comprising them under specific conditions, can be suitably used as an additive for cement slurry for a well; and this additive contained in cement slurry for a well can reduce the amount of free water generated from cement slurry in any environment of cold regions, warm regions and high-temperature regions while producing excellent dispersibility, fluidity and cement strength.

Specifically, the present invention will be summarized as follows.

<1> An additive for cement slurry for a well, comprising an aqueous dispersion of silica having an average particle size of 3 to 200 nm by a dynamic light scattering method, and a compound having an alcoholic hydroxyl group as a dispersion stabilizer, wherein
the additive for cement slurry for a well comprises 1 to 30 mol of the compound per 1000 g of a dispersion medium in the aqueous dispersion of silica.

<2> The additive for cement slurry for a well according to <1>, wherein the compound is at least one alcohol selected from the group consisting of methanol, ethanol, isopropyl alcohol, ethylene glycol, diethylene glycol, propylene glycol, and glycerin.

<3> The additive for cement slurry for a well according to <1> or <2>, wherein the compound is at least one polyhydric alcohol selected from the group consisting of ethylene glycol, diethylene glycol, propylene glycol, and glycerin.

<4> The additive for cement slurry for a well according to any one of <1> to <3>, wherein the compound is propylene glycol.

<5> The additive for cement slurry for a well according to any one of <1> to <4>, wherein in the case of retaining the additive for cement slurry for a well at −20° C. for 48 hours and subsequently measuring an average particle size by the dynamic light scattering method at +20° C., the average particle size falls within a range of 1.0 to 7.0 times the initial average particle size before the retention.

<6> The additive for cement slurry for a well according to any one of <1> to <4>, wherein in the case of retaining the additive for cement slurry for a well at +50° C. for 7 days and subsequently measuring an average particle size by the dynamic light scattering method at +20° C., the average particle size falls within a range of 1.0 to 7.0 times the initial average particle size before the retention.

<7> A method for storing an additive for cement slurry for a well according to any one of <1> to <6>, comprising the step of
    retaining the additive for cement slurry for a well in a liquid state in a temperature range of −30° C. to +60° C.

<8> A method for storing an additive for cement slurry for a well according to any one of <1> to <6>, comprising the steps of:
    freezing the additive for cement slurry for a well; and
    thawing the frozen additive for cement slurry for a well, followed by redispersion.

<9> Cement slurry for a well, comprising an additive according to any one of <1> to <6>, wherein
    the cement slurry for a well comprises
    0.1% to 10% BWOC of silica,
    30 to 60% BWOC of water, and
    0.03 to 3.0% BWOC of a dispersion stabilizer.

<10> The cement slurry for a well according to <9>, further comprising
    0.1 to 5% BWOC of a cement hardening retarder, and
    0.001 to 10% BWOC of at least one auxiliary agent selected from the group consisting of a dehydration regulator, an antifoamer, a hardening accelerator, a cement dispersant, a cement strength stabilizer, and a lost circulation material.

<11> A cementing method for a well, comprising injecting cement slurry for a well according to <9> or <10> to a gap between a casing pipe inserted in the well and the stratum in boring of the well, followed by hardening.

Advantageous Effects of Invention

The additive for cement slurry for a well of the present invention is not frozen even in cold regions under low-temperature conditions of −30° or, if frozen, has favorable redispersibility by thawing, because a dispersion stabilizer that stably disperses a silica particle is added to aqueous silica sol. Hence, cement slurry supplemented with the additive for cement slurry for a well of the present invention can suppress the occurrence of free water from the cement slurry, achieves high cement strength while having excellent fluidity, and can suppress faulty workmanship (e.g., insufficient fixation of a casing due to lean cement which cannot fill the space between the casing and the stratum). Furthermore, the additive for cement slurry for a well of the present invention is stable in both warm regions of 20 to 25° C. and high-temperature regions of 60° C. Therefore, cement slurry supplemented therewith can suppress the occurrence of free water from the cement slurry, and can achieve high cement strength while having excellent fluidity.

Thus, the addition of the additive for cement slurry for a well of the present invention to cement slurry allows well finishing to be stably carried out with high productivity in any environment of cold regions, warm regions and high-temperature regions.

DESCRIPTION OF EMBODIMENTS

Hereinafter, preferred embodiments of the present invention will be described. However, the embodiments described below are given for illustrating the present invention. The present invention is not limited by these embodiments by any means.

In the present specification, a numerical range represented using "to" means a range that includes numerical values described before and after "to" as the lower limit value and the upper limit value.

<Additive for Cement Slurry for Well>

The additive for cement slurry for a well of the present invention comprises an aqueous dispersion of silica having an average particle size of 3 to 200 nm by a dynamic light scattering method (DLS method) (hereinafter, also referred to as a DLS particle size), and comprises a compound having an alcoholic hydroxyl group as a dispersion stabilizer. As shown in Examples mentioned later, aqueous silica sol thus supplemented with the dispersion stabilizer that stably disperses a silica particle is not frozen or, if temporarily frozen, can produce a dispersion having favorable dispersibility by subsequent thawing, for example, even when stored below freezing. In this context, as one example of a criterion for determining whether or not to have favorable dispersibility by thawing, if temporarily frozen, the DLS particle size of the dispersoid redispersed after thawing is preferably within 7.0 times, more preferably within 1.5 times the DLS particle size before the freezing. In this case, favorable dispersibility by thawing after temporary freezing can be determined.

In one embodiment of the present invention, the average particle size of the additive for cement slurry for a well retained at −20° C. for 48 hours, followed by measurement by the dynamic light scattering method at +20° C. falls within a range of 1.0 to 7.0 times the initial average particle size before the retention by the dynamic light scattering method.

In one embodiment of the present invention, the average particle size of the additive for cement slurry for a well retained at +50° C. for 7 days, followed by measurement by the dynamic light scattering method at 20° C. falls within a range of 1.0 to 7.0 times the initial average particle size before the retention by the dynamic light scattering method.

In one embodiment of the present invention, the compound having an alcoholic hydroxyl group which is a dispersion stabilizer is contained in 1 to 30 mol per 1000 g of a dispersion medium (water) in the aqueous dispersion of silica.

The lower limit value of the range of the content of the compound per 1000 g of the dispersion medium is preferably 1 mol, more preferably 5 mol, further preferably 10 mol. The upper limit value of the range of the content of the compound per 1000 g of the dispersion medium is preferably 30 mol, more preferably 25 mol, further preferably 20 mol.

The content of the compound which is equal to or more than the lower limit value per 1000 g of the dispersion medium is preferred because the redispersibility of the silica sol is favorable even when the additive for cement slurry is temporarily frozen at −10° C. to −30° C. and then thawed, and the occurrence of free water from cement slurry can be suppressed. The content of the compound which is equal to or less than the upper limit value per 1000 g of the dispersion medium is preferred because the amount of the dispersion stabilizer added can be reduced while its effect is secured, and cost reduction can be attained.

(Silica)

Commercially available aqueous silica sol can be used as the aqueous silica sol used in the present invention. The silica ($SiO_2$) concentration of the aqueous silica sol used is not particularly limited and can be, for example, 5 to 55% by mass. Examples of the commercially available alkaline aqueous silica sol include Snowtex® ST-XS, Snowtex ST-S, Snowtex ST-30, Snowtex ST-M30, Snowtex ST-20L, Snowtex ST-YL, and Snowtex ST-ZL (all manufactured by Nissan Chemical Corp.). Examples of the acidic aqueous silica sol include Snowtex® ST-OXS, Snowtex ST-OS, Snowtex ST-O, Snowtex ST-O-40, Snowtex ST-OL, Snowtex ST-OYL, and Snowtex ST-OZL-35 (all manufactured by Nissan Chemical Corp.).

In the present invention, the average particle size of the aqueous silica sol (colloidal silica particle) can be determined as an average particle size by a dynamic light scattering method (DLS method).

The DLS particle size represents an average value of secondary particle sizes (dispersed particle sizes). The DLS particle size in a completely dispersed state is reportedly on the order of twice the average particle size (which is a specific surface area diameter obtained through measurement by a nitrogen adsorption method (BET method) and represents an average value of primary particle sizes). A larger DLS particle size can be determined to indicate a more aggregated state of silica particles in the aqueous silica sol.

The average particle size of the aqueous silica sol is preferably 3 to 200 nm. If the average particle size is smaller than 3 nm, the stability of the aqueous silica sol might be deteriorated. If the average particle size is larger than 200 nm, the occurrence of free water in cement slurry cannot be suppressed without adding a large amount of the aqueous silica sol. This might increase cost.

The silica particle size of the aqueous silica sol may be determined as a specific surface area diameter obtained through measurement by a nitrogen adsorption method (BET method), or a Sears method particle size.

The specific surface area diameter obtained through measurement by a nitrogen adsorption method (BET method) (average particle size (specific surface area diameter) D (nm)) is given according to the expression $D \text{ (nm)}=2720/S$ from specific surface area S ($m^2/g$) measured by the nitrogen adsorption method.

The Sears method particle size refers to an average particle size measured on the basis of a rapid measurement method for colloidal silica particle sizes described in the document: G. W. Sears, Anal. Chem. 28 (12), p. 1981, 1956. Specifically, the specific surface area of colloidal silica is determined from an amount of 0.1 N NaOH required to titrate colloidal silica corresponding to 1.5 g of $SiO_2$ from pH 4 to pH 9, and an equivalent size (specific surface area diameter) is calculated therefrom.

(Dispersion Stabilizer)

A compound having an alcoholic hydroxyl group can be used as the dispersion stabilizer used in the present invention.

In one embodiment of the present invention, examples of the compound having an alcoholic hydroxyl group which is a dispersion stabilizer can include at least one alcohol selected from the group consisting of methanol, ethanol, isopropyl alcohol, ethylene glycol, diethylene glycol, propylene glycol, and glycerin. Among them, at least one polyhydric alcohol selected from the group consisting of ethylene glycol, diethylene glycol, propylene glycol, and glycerin is preferred. Among them, propylene glycol is particularly preferred which has low toxicity to human bodies and high environmental safety.

The polyhydric alcohol such as propylene glycol has a boiling point of 180 to 300° C. and thus has a higher boiling point than that of, for example, methanol. Therefore, cement slurry containing an additive comprising the polyhydric alcohol such as propylene glycol, not methanol, as a dispersion stabilizer further has the advantages that the cement slurry can be prevented from forming a hollow cavity in cement due to vaporization, for example, by heating at underground temperature, and by extension, can suppress reduction in strength of hardened cement.

In one embodiment of the present invention, a dispersion stabilizer having a freezing point lowering function can be suitably used. In addition to the compound described above, water-soluble primary, secondary or tertiary amine may be used as the dispersion stabilizer having a freezing point lowering function.

In one embodiment of the present invention, the dispersion stabilizer brings about the advantages that even if the additive for cement slurry for a well of the present invention is stored in an environment over a temperature range of −30° C. to +60° C. or in an environment over a temperature range of −20° C. to +50° C., silica particles can be dispersed into a dispersion medium, or silica particles can be redispersed into a dispersion medium by thawing after temporary freezing, and a homogeneous and favorable dispersion having extremely excellent preservation stability can be obtained.

<Method for Storing Additive for Cement Slurry for Well>

In one embodiment of the present invention, the method for storing the additive for cement slurry for a well comprises the step of retaining the additive for cement slurry for a well in a liquid state in a temperature range of −30° C. to +60° C.

In one embodiment of the present invention, the method for storing the additive for cement slurry for a well comprises the step of retaining the additive for cement slurry for a well in a liquid state in a temperature range of −20° C. to +50° C.

The storage period within the temperature range is preferably 6 months, more preferably 3 months, further preferably 2 months, most preferably 1 month.

In one embodiment of the present invention, the method for storing the additive for cement slurry for a well comprises the steps of: freezing the additive for cement slurry for a well; and thawing the frozen additive for cement slurry for a well, followed by redispersion.

Thus, according to an embodiment of the present invention, the advantages can be brought about that even if the additive of the present invention is stored in the wide temperature range described above over the predetermined storage period, as mentioned above, silica particles can be dispersed into a dispersion medium, or silica particles can be redispersed into a dispersion medium by thawing after temporary freezing, and a homogeneous and favorable additive for cement slurry for a well can be stored or preserved over a long period with good preservation stability, owing to synergistic effects of the specific dispersion stabilizer and the specific silica particle used in the present invention.

<Cement Slurry for Well>

The cement slurry for a well of the present invention comprises, as an additive, a composition comprising an aqueous dispersion of silica having the predetermined average particle size, and a compound having an alcoholic hydroxyl group as a dispersion stabilizer. As shown in Examples mentioned later, cement slurry containing, as an additive for cement slurry for a well, such an aqueous dispersion comprising both the aqueous dispersion of silica having the predetermined average particle size, and the compound having an alcoholic hydroxyl group as a dispersion stabilizer, as essential constituents can be stored or preserved in a temperature range from sub-zero to relatively high temperature over a long period with good preservation stability, and furthermore, the occurrence of free water from cement slurry can also be advantageously suppressed.

In one embodiment of the present invention, the cement slurry for a well is slurry comprising the additive for cement slurry for a well in any form of the present invention, and comprises cement such as oil well cement and also comprises 0.1% to 10% BWOC of silica, 30 to 60% BWOC of water, and 0.03 to 3.0% BWOC of a dispersion stabilizer, based on the cement. In this context, the % BWOC means % by mass based on the dry solid content of cement (by weight of cement) and is a technical item well known to those skilled in the art.

In one embodiment of the present invention, the cement slurry for a well is slurry comprising the additive for cement slurry for a well in any form of the present invention, and comprises cement such as oil well cement and also comprises 0.1% to 10% BWOC of silica, 30 to 60% BWOC of water, and 0.03 to 3.0% BWOC of a dispersion stabilizer, based on the cement.

The lower limit value of the range of the content ratio of the silica (solid content) is preferably 0.1% BWOC, more preferably 0.15% BWOC, further preferably 0.2% BWOC. The upper limit value of the range of the content ratio of the silica (solid content) is preferably 10% BWOC, more preferably 1% BWOC, further preferably 0.5% BWOC.

The content ratio of the silica (solid content) which is equal to or more than the lower limit value is preferred because the cement slurry can be prevented from having too low viscosity and the amount of free water generated can be reduced. The content ratio of the silica (solid content) which is equal to or less than the upper limit value is preferred because the cement slurry can be prevented from having too high viscosity during preparation and a predetermined amount of cement can be charged without difficulty.

The lower limit value of the range of the content ratio of the dispersion stabilizer is preferably 0.03% BWOC, more preferably 0.04% BWOC, further preferably 0.1% BWOC. The upper limit value of the range of the content ratio of the dispersion stabilizer is preferably 3.0% BWOC, more preferably 1% BWOC, further preferably 0.5% BWOC.

The content ratio of the dispersion stabilizer which is equal to or more than the lower limit value is preferred because the redispersibility of the silica sol is favorable even when the additive for cement slurry is temporarily frozen at −10° C. to −30° C. and then thawed, and the occurrence of free water from cement slurry can be suppressed. The content ratio of the dispersion stabilizer which is equal to or less than the upper limit value is preferred because the amount of the dispersion stabilizer added can be reduced while its effect is secured, and cost reduction can be attained.

The cement slurry for a well of the present invention may comprise 30 to 60% BWOC of water. Fresh water, tap water, industrial water, pure water or seawater, etc. can be appropriately used as the water used.

(Other Components Contained)

The cement slurry for a well of the present invention may also contain other auxiliary agents, in addition to the oil well cement, the additive for cement slurry for a well and water.

Any of class A cement to class H cement of the specification "APISPEC 10A Specification for Cements and Materials for Well" of API (American Petroleum Institute) can be used as the oil well cement. Among them, class G cement and class H cement are more preferred because quality governing is easily performed with an additive or an auxiliary agent and they can be used in a wide range of depths or temperatures.

The cement hardening retarder is used for maintaining moderate fluidity of the cement slurry until the completion of work and adjusting a thickening time.

The cement hardening retarder contains a main component such as ligninsulfonates, naphthalenesulfonates, and borates.

At least one type of auxiliary agent selected from the group consisting of a dehydration regulator, an antifoamer, a light-weight aggregate, a heavy-weight aggregate, a cement hardening accelerator, a cement dispersant, a cement strength stabilizer, and a lost circulation material can be contained as an additional auxiliary agent.

The dehydration regulator can be used for the purpose of, for example, protecting the stratum sensitive to water or preventing the early dehydration of slurry, and contains a main component such as organic high-molecular-weight polymers and vinylamide-vinylsulfonic acid copolymers.

The antifoamer contains a main component such as silicon compounds and higher alcohols.

The light-weight aggregate can be used for the purpose of, for example, decreasing the specific weight of the cement slurry in the presence of a layer having lost circulation or a layer having a low pressure, and contains a main component such as bentonite, gilsonite, diatomaceous earth, pearlite, hollow pearlite particles, hollow fly ash particles, hollow aluminosilicate glass particles, hollow sodium borosilicate particles, hollow alumina particles, or hollow carbon particles.

The heavy-weight aggregate can be used for the purpose of, for example, increasing the specific weight of the cement slurry in order to improve replacement efficiency with kill mud in a layer having a high pressure, and contains a main component such as barium sulfate, hematite, or ilmenite.

The cement hardening accelerator is used for the purpose of, for example, initial strength or the shortening of a waiting time for hardening, and contains a main component such as calcium chloride, liquid glass, and gypsum.

The cement dispersant can be used for the purpose of, for example, lowering the viscosity of the cement slurry and enhancing replacement efficiency with mud water, and contains a main component such as naphthalenesulfonic acid formalin condensates, polyacrylic acid condensates and sulfonated melamine condensates.

The cement strength stabilizer contains a main component such as fly ash and silica.

The lost circulation material is used for preventing lost circulation, is in the form of, for example, inactive grains that do not influence the properties of cement, and contains a main component such as walnut hulls, vermiculite, gilsonite, mica, and cellophane fragments.

The cement slurry for a well of the present invention may contain a cement composition for an ordinary structure, various types of cement or aggregate for use in concrete compositions, and other additives for use in such cement compositions or the like, in addition to the cement such as oil well cement, the additive for cement slurry for a well in any form of the present invention, the cement hardening retarder, and other additives or auxiliary agents as described above.

Examples of the conventional common cement for an ordinary structure that may be used include Portland cement (e.g., normal Portland cement, high-early-strength Portland cement, ultrahigh-early-strength Portland cement, low-heat/moderate-heat Portland cement, and sulfate-resisting Portland cement), various types of blended cement (blast furnace cement, silica cement, fly ash cement, etc.), white Portland cement, alumina cement, ultrarapid hardening cement (one-clinker ultrarapid hardening cement, two-clinker ultrarapid hardening cement, and magnesium phosphate cement), cement for grout, low-heat cement (low-heat blast furnace cement, fly ash blended low-heat blast furnace cement, and belite-rich cement), ultra-high strength cement, cement-based solidifying materials, and eco-cement (cement produced by using one or more of incinerated ash of municipal waste and incinerated ash of sewage sludge as a raw material). Further, a fine powder such as blast furnace slag, fly ash, cinder ash, clinker ash, husk ash, fumed silica, a silica powder or a limestone powder, or gypsum may be added as an admixture.

Gravels, crushed stones, granulated slag, and a recycled aggregate as well as a refractory aggregate such as silica, clay, zircon, high-alumina, silicon carbide, graphite, chrome, chrome-magnesia, or magnesia may be used as the aggregate.

Known cement or concrete additives such as high-range AE water reducing agents, high-range water reducing agents, AE water reducing agents, water reducing agents, air-entraining agents (AE agents), foaming agents, segregation controlling admixtures, thickeners, shrinkage reducing agents, curing compounds, and water repellents can be blended as other additives for use in the cement composition or the like.

<Cementing Method for Well>

In one embodiment of the present invention, the cementing method for a well is a method using the cement slurry for a well in any form of the present invention and is a method comprising injecting the cement slurry for a well to a gap between a casing pipe inserted in the well and the stratum, followed by hardening.

In one embodiment of the present invention, the cementing method for a well can suppress the occurrence of free water from cement slurry by using the cement slurry for a well in any form of the present invention in filling the void space between the stratum and a casing pipe with oil well cement in boring for oil fields or gas oil fields in cold areas.

EXAMPLE

Hereinafter, the present invention will be described in more detail with reference to Preparation Examples of an additive for cement slurry for a well, Examples and Comparative Examples. However, the present invention is not limited by these examples by any means.

(Measurement Apparatus and Method)

The additive for cement slurry was analyzed (silica solid content concentration, pH value, conductance, DLS particle size, and viscosity) using the following apparatuses.

Silica solid content concentration: The silica solid content concentration was calculated from the blending amounts of commercially available aqueous silica sol having a known silica solid content concentration and a dispersion stabilizer having a freezing point lowering function.

pH: A pH meter (manufactured by DKK-TOA Corp.) was used.

Conductance: A conductance meter (manufactured by DKK-TOA Corp.) was used.

Viscosity: A type B viscometer (manufactured by Tokyo Keiki Inc.) was used.

DLS particle size (dynamic light scattering particle size): A dynamic light scattering particle size measurement apparatus Zetasizer Nano (manufactured by Malvern Panalytical, a part of Spectris plc) was used.

<Preparation of Additive for Cement Slurry>
<Additive A for Cement Slurry>

A 300 ml styrol bottle was charged with a magnet stirrer and charged with 286 g of commercially available aqueous silica sol Snowtex® ST-S(pH=10.1, $SiO_2$ concentration=30.5% by mass, conductance=4280 µS/cm, viscosity=10.2 mPa·s, DLS particle size=15.3 nm, manufactured by Nissan Chemical Corp.). Then, 14.7 g of propylene glycol (manufactured by Kanto Chemical Co., Inc.) as a dispersion stabilizer having a freezing point depression function was added thereto with stirring using the magnet stirrer, and the resultant was stirred for 30 minutes to prepare additive A for cement slurry (pH=9.9, conductance=3180 µS/cm, $SiO_2$ concentration=29.0% by mass, propylene glycol concentration=4.6% by mass, viscosity=11.2 mPa·s, DLS particle size=16.3 nm). In this respect, the amount of the dispersion stabilizer added corresponds to 1.0 mol per 1000 g of water contained in the aqueous silica sol.

<Additive B for Cement Slurry>

Additive B for cement slurry (pH=10.1, conductance=2230 µS/cm, $SiO_2$ concentration=27.5% by mass, propylene glycol concentration=9.6% by mass, viscosity=12.2 mPa·s, DLS particle size=16.8 nm) was prepared by the same operation except that 270.0 g of commercially available aqueous silica sol Snowtex® ST-S, and 30.0 g of propylene glycol (manufactured by Kanto Chemical Co., Inc.) as a dispersion stabilizer having a freezing point depression function were added. In this respect, the amount of the dispersion stabilizer added corresponds to 2.0 mol per 1000 g of water contained in the aqueous silica sol.

<Additive C for Cement Slurry>

Additive C for cement slurry (pH=10.5, conductance=308 µS/cm, $SiO_2$ concentration=19.3% by mass, propylene glycol concentration=41.3% by mass, viscosity=19.0 mPa·s, DLS particle size=18.9 nm) was prepared by the same operation except that 174.9 g of commercially available aqueous silica sol Snowtex® ST-S, and 125.1 g of propylene glycol (manufactured by Kanto Chemical Co., Inc.) as a dispersion stabilizer having a freezing point depression function were added. In this respect, the amount of the dispersion stabilizer added corresponds to 13.5 mol per 1000 g of water contained in the aqueous silica sol.

<Additive D for Cement Slurry (Comparative Example)>

Additive D for cement slurry (pH=9.9, conductance=3680 µS/cm, $SiO_2$ concentration=29.8% by mass, propylene glycol concentration=2.1% by mass, viscosity=11.2 mPa·s, DLS particle size=16.8 nm) was prepared by the same operation except that 293.7 g of commercially available aqueous silica sol Snowtex® ST-S, and 6.3 g of propylene glycol (manufactured by Kanto Chemical Co., Inc.) as a dispersion stabilizer having a freezing point depression function were added. In this respect, the amount of the dispersion stabilizer added corresponds to 0.4 mol per 1000 g of water contained in the aqueous silica sol.

<Additive E for Cement Slurry>

A 300 ml styrol bottle was charged with a magnet stirrer and charged with 293.7 g of commercially available aqueous silica sol Snowtex® ST-S (pH=10.1, conductance=3700 μS/cm, $SiO_2$ concentration=30.5% by mass, viscosity=10.2 mPa·s, DLS particle size=15.3 nm, manufactured by Nissan Chemical Corp.). Then, 6.3 g of methanol (manufactured by Kanto Chemical Co., Inc.) as a dispersion stabilizer having a freezing point depression function was added thereto with stirring using the magnet stirrer, and the resultant was stirred for 30 minutes to prepare additive E for cement slurry (pH=9.9, $SiO_2$ concentration=29.8% by mass, methanol concentration=2.1% by mass, viscosity=10.8 mPa·s, DLS particle size=15.1 nm). In this respect, the amount of the dispersion stabilizer added corresponds to 1.0 mol per 1000 g of water contained in the aqueous silica sol.

<Additive F for Cement Slurry>

Additive F for cement slurry (pH=10.0, conductance=3190 μS/cm, $SiO_2$ concentration=29.0% by mass, methanol concentration=4.5% by mass, viscosity=11.3 mPa·s, DLS particle size=16.7 nm) was prepared by the same operation except that 286.05 g of commercially available aqueous silica sol Snowtex® ST-S, and 13.5 g of methanol (manufactured by Kanto Chemical Co., Inc.) as a dispersion stabilizer having a freezing point depression function were added. In this respect, the amount of the dispersion stabilizer added corresponds to 2.0 mol per 1000 g of water contained in the aqueous silica sol.

<Additive G for Cement Slurry>

Additive G for cement slurry (pH=10.4, conductance=1260 μS/cm, $SiO_2$ concentration=23.4% by mass, methanol concentration=23.2% by mass, viscosity=18.0 mPa·s, DLS particle size=17.6 nm) was prepared by the same operation except that 230.4 g of commercially available aqueous silica sol Snowtex® ST-S, and 69.6 g of methanol (manufactured by Kanto Chemical Co., Inc.) as a dispersion stabilizer having a freezing point depression function were added. In this respect, the amount of the dispersion stabilizer added corresponds to 13.5 mol per 1000 g of water contained in the aqueous silica sol.

As mentioned later, the additives A to C and E to G, and D for cement slurry were used in Examples 1 to 3 and Examples 4 to 6, and Comparative Example 2, respectively. Snowtex® ST-S alone without the addition of the dispersion stabilizer having a freezing point depression function was used in Comparative Example 1. Table 1 shows the components of each additive for cement slurry.

<Low-Temperature or High-Temperature Storage and Physical Property Measurement of Additive for Cement Slurry>

For low-temperature storage, a propylene container (capacity: 100 ml) with a screw cap was charged with 100 g of each of the additives A to F for cement slurry, then capped, and stored for 48 hours in a cryostat of −20° C. Then, the additive for cement slurry was taken out thereof, and its external appearance was observed. If not frozen, the additive for cement slurry was brought back to normal temperature, followed by the measurement of a pH value, a conductance, a DLS particle size, and viscosity. If frozen, the additive for cement slurry was charged into a thermostat of +25° C. and thawed, followed by the measurement of a pH value, a conductance, a DLS particle size, and viscosity.

For high-temperature storage, a propylene container (capacity: 100 ml) with a screw cap was charged with 100 g of each of the additives A to F for cement slurry, then capped, and stored for 7 days in a thermostat of +50° C. Then, the additive for cement slurry was taken out thereof, and its external appearance was observed. The additive for cement slurry was brought back to normal temperature, followed by the measurement of a pH value, a conductance, a DLS particle size, and viscosity.

These measurement results are shown in Table 2.

The redispersibility of the additive for cement slurry thus stored at a low temperature or a high temperature was determined as follows by calculating the ratio of the DLS particle size after the low-temperature or high-temperature storage/the DLS particle size before the start of storage.

⊚: The ratio of the DLS particle size was 1.0 to less than 1.2, and the redispersibility was very favorable.

○: The ratio of the DLS particle size was 1.2 to 1.5, and the redispersibility was favorable.

Δ: The ratio of the DLS particle size was 1.6 to 7.0, and the redispersibility was fair.

X: The redispersibility was very poor because white particles were generated in large amounts and severely precipitated.

<Preparation of Cement Slurry>

Cement slurry was prepared in accordance with the API specification (specification regarding petroleum stipulated by the American Petroleum Institute) 10B-2 using a dedicated apparatus and the materials and the charging ratios shown in Table 2. Specifically, a dedicated mixer was charged with pure water and charged with a commercially available dehydration regulator, aqueous silica sol, a commercially available hardening retarder and antifoamer, and class G cement (manufactured by Ube-Mitsubishi Cement Corp.) in the blending amounts shown in Table 1 in 90 seconds while a stirring blade was rotated at 4000 rpm. The number of revolutions of the stirring blade was increased to 12000 rpm, and stirring was performed for 35 seconds to prepare cement slurry.

Each cement slurry thus prepared was evaluated for fluidity by the following procedures and further evaluated for the specific weight of the slurry, the amount of free water, and fluid loss using dedicated apparatuses in accordance with the API specification.

1) Measurement of Slurry Specific Weight

The specific weight of 100 cc of the prepared cement slurry was measured using a stainless cup hydrometer having a capacity of 100 ml.

2) Measurement of Amount of Free Water

Approximately 460 cc of the prepared cement slurry was warmed to 88° C. over 30 minutes using a conditioning apparatus Atmospheric Consistometer Model 165AT (manufactured by Fann Instrument Company) described in the API specification, and then retained at 88° C. for 1 hour for conditioning.

A resin measuring cylinder having an object capacity of 250 cc was charged with 250 cc of the conditioned cement slurry, and the measuring cylinder was tilted by 45 degrees and left standing for 2 hours. After the 2-hour still standing, water liberated in the upper portion of the slurry was collected with a dropper, and the amount thereof (% by volume per 250 cc of the slurry) was regarded as the amount of free water.

The API specification does not particularly define the numerical range of the amount of free water, but states that 2% by volume or less is suitable.

3) Measurement of Fluid Loss

Approximately 460 cc of the prepared cement slurry was warmed to 88° C. over 30 minutes using a conditioning apparatus Atmospheric Consistometer Model 165AT (manufactured by Fann Instrument Company) described in the API specification, and then retained at 88° C. for 1 hour for conditioning.

A 130 cc aliquot was separated from the conditioned cement slurry, and a fluid loss measurement apparatus Fluid Loss Test Instrument (manufactured by Fann Instrument Company) described in the API specification was charged therewith. Then, water generated (dehydration) from the cement slurry when a pressure of 1,000 psi was continuously applied thereto for 30 minutes under a condition of 88° C. was recovered into a resin measuring cylinder having a capacity of 100 cc. Amount $V_t$ of dehydration for the measurement time (30 min) was applied to expression 1 to calculate fluid loss.

[Expression 1]

$$\text{Fluid loss} = 2V_t \sqrt{\frac{30}{t}} \qquad \text{(Expression 1)}$$

The API specification does not particularly define the numerical range of the fluid loss, but states that approximately 100 ml or less is suitable.

Table 2 shows the obtained results of evaluating the specific weight of the cement slurry, the amount of free water, and the fluid loss.

TABLE 1

Table 1 Component of additive for cement slurry, and cement slurry component (before start of storage)

|   |   | Example 1 | Example 2 | Example 3 | Example 4 | Example 5 | Example 6 | Comparative Example 1 | Comparative Example 2 |
|---|---|---|---|---|---|---|---|---|---|
|   | Component of additive for cement slurry |   |   |   |   |   |   |   |   |
| (a) | Contents of additive | Additive A | Additive B | Additive C | Additive E | Additive F | Additive G | *1 | Additive D |
| (b) | Average particle size [DLS particle size] of silica | 16.3 | 16.8 | 18.9 | 15.1 | 16.7 | 17.6 | — | — |
| (c) | Type of dispersion stabilizer | Propylene glycol | | | | Methano | | None | Propylene glycol |
| (d) | The number of moles of dispersion stabilizer per 1000 g of water contained in aqueous silica sol | 1.0 | 2.0 | 13.5 | 1.0 | 2.0 | 13.5 | 0 | 0.4 |
|   | Cement slurry component |   |   |   |   |   |   |   |   |
| (A) | Class G cement (% BWOC) |   | 100.00 |   |   | 100.00 |   | 100.00 | 100 00 |
| (B) | Silica (% BWOC) |   | 0.24 |   |   | 0.24 |   | 0.24 | 0.24 |
| (C) | Dispersion stabilizer (% BWOC) | 0.04 | 0.09 | 0.52 | 0.02 | 0.04 | 0.24 | 0 | 0.02 |
| (D) | Pure water (% BWOC) | 46.82 | 46.82 | 46.40 | 46.83 | 46.82 | 46.61 | 46.85 | 46.83 |
| (E) | Dehydration regulator (% BWOC) |   | 2.16 |   |   | 2.16 |   | 2.16 | 2.16 |
| (F) | Hardening retarder (% BWOC) |   | 0.20 |   |   | 0.20 |   | 0.20 | 0.20 |
| (G) | Antifoamer (% BWOC) |   | 0.09 |   |   | 0.09 |   | 0.09 | 0.09 |

[Remarks] "*1" : Snowtex(R) ST-S alone
"—" : No data

TABLE 2

Table 2 Evaluation results

|   | Example 1 | Example 2 | Example 3 | Example 4 | Example 5 | Example 6 | Comparative Example 1 | Comparative Example 2 |
|---|---|---|---|---|---|---|---|---|
| ( I ) After storage at normal temperature for 24 hr |   |   |   |   |   |   |   |   |
| External appearance immediately after storage | Clear liquid | Clear liquid | Clear liquid | Clear liquid | Clear liquid | Clear liquid | Clear liquid | Clear liquid |
| pH | 9.9 | 10.1 | 10.5 | 9.9 | 10.0 | 10.4 | 10.1 | — |
| Conductance (μS/cm) | 3180 | 2230 | 308 | 3700 | 3190 | 1260 | 4280 | — |
| Viscosity (mPa · s) | 11.2 | 12.2 | 19.0 | 10.8 | 11.3 | 9.3 | 15.6 | — |
| DLS particle size (nm) | 16.3 | 16.8 | 18.9 | 15.1 | 16.7 | 17.6 | 15.3 | — |
| Ratio of DLA particle size after storage to DLS particle size before storage | 1.0 | 1.0 | 1.0 | 1.0 | 1.0 | 1.0 | 1.0 | — |

TABLE 2-continued

Table 2 Evaluation results

|  | Example 1 | Example 2 | Example 3 | Example 4 | Example 5 | Example 6 | Comparative Example 1 | Comparative Example 2 |
|---|---|---|---|---|---|---|---|---|
| Determination of redispersibility | ◎ | ◎ | ◎ | ◎ | ◎ | ◎ | ◎ | — |
| Specific weight of cement slurry | 1.85 | 1.85 | 1.85 | 1.85 | 1.85 | 1.85 | 1.86 | — |
| Fluid loss [ml/30 min] | 88 | 74 | 84 | 74 | 78 | 88 | 88 | — |
| Amount of free water [% by vol] | 0.0 | 0.0 | 0.0 | 0.0 | 0.0 | 0.0 | 0.0 | — |
| (II) After storage at −20° C. for 48 hr (physical property measurement after thawing of frozen product) | | | | | | | | |
| External appearance immediately after storage | Frozen | Frozen | Not frozen | Frozen | Frozen | Not frozen | Frozen | Frozen |
| pH | 9.9 | 10.0 | 10.5 | 9.9 | 10.0 | 10.4 | 10.4 | 10.0 |
| Conductance (μS/cm) | 3040 | 2210 | 303 | 3210 | 3090 | 1268 | 1500 | 2390 |
| Viscosity (mPa · s) | 14.8 | 14, 4 | 18.3 | 20.5 | 14.5 | 8.5 | *2 | 400 |
| DLS particle size (nm) | 23.9 | 20.4 | 20.9 | 86.2 | 23.3 | 17.9 | *2 | 4711 |
| Ratio of DLA particle size her storage to DLS particle size before storage | 1.5 | 1.2 | 1.1 | 5.7 | 1.4 | 1.0 | — | 280 |
| Determination of redispersibility | ○ | ○ | ◎ | Δ | ○ | ◎ | X | X |
| Specific weight of cement slurry | 1.85 | 1.85 | 1.85 | 1.85 | 1.85 | 1.85 | 1.85 | 1.85 |
| Fluid loss [ml/30 min] | 84 | 88 | 80 | 85 | 86 | 92 | 86 | 70 |
| Amount of free water [% by vol] | 0.0 | 0.0 | 0.0 | 0.1 | 0.0 | 0.0 | 5.8 | 4.0 |
| (III) After storage at +50° C. for 7 d | | | | | | | | |
| External appearance immediately after storage | Clear liquid | Clear liquid | Clear liquid | Clear liquid | Clear liquid | Clear liquid | Clear liquid | Clear liquid |
| pH | 9.8 | 10.0 | 10.5 | 9.8 | 9.9 | 10.4 | — | — |
| Conductance (μS/cm) | 3200 | 2260 | 293 | 3750 | 3220 | 1258 | — | — |
| Viscosity (mPa · s) | 11.6 | 11.6 | 0.20 | 10.4 | 11.2 | 8.9 | — | — |
| DLS particle size (nm) | 16.8 | 17.0 | 21.1 | 16.7 | 16.2 | 18.0 | — | — |
| Ratio of DLA particle size after storage to DLS pancle size before storage | 1.0 | 1.0 | 1.1 | 1.1 | 1.0 | 1.0 | — | — |
| Determination of redispersibility | ◎ | ◎ | ◎ | ◎ | ◎ | ◎ | — | — |
| Specific weight of cement slurry | 1.86 | 1.86 | 1.85 | 1.86 | 1.86 | 1.85 | — | — |
| Fluid loss [ml/30 min] | 86 | 84 | 82 | 86 | 82 | 88 | — | — |
| Amount of free water [% by vol] | 0.0 | 0.0 | 0.0 | 0.0 | 0.0 | 0.0 | — | — |

Remarks "*2" : Immeasurable due to severely precipitated particles
"—" : No data
Determination of redispersibility :
◎ : The ratio of the DLS particle size was 1.0 to less than 1.2, and the redispersibility was very favorable.
○ : The ratio of the DLS particle size was 1.2 to 1.5, and the redispersibility was favorable.
Δ : The ratio of the DES particle size was 1.6 to 7.0, and the redispersibility was fair.
X : The redispersibility as very poor because white particles were generated in large amounts and severely precipitated.

DISCUSSION

As shown in Comparative Example 1, in the case of storing the aqueous silica sol at normal temperature, the amount of free water generated from the cement slurry was 0% without adding the dispersion stabilizer having a freezing point lowering function. However, as shown in Comparative Example 1, the aqueous silica sol when stored at −20° C. was severely gelled and precipitated as coarse particles. In addition, the amount of free water generated from the cement slurry was as very large as 5.8%. Thus, it is evident that the quality of the cement slurry was poor.

As shown in Comparative Example 2, when the additive for cement slurry containing only 0.4 mol, which was smaller than 1 mol, of propylene glycol as the dispersion stabilizer having a freezing point lowering function per 1000 g of the dispersion medium in the aqueous dispersion of silica was stored at −20° C., the aqueous silica sol was gelled and the ratio of the DLS particle size after the storage at −20° C./the DLS particle size of the product stored at normal temperature was 280 which was very large. As is evident from Comparative Example 2, the amount of free water generated from the cement slurry was 4.0%, and a suppressive effect was reduced.

On the other hand, as shown in Example 1 to Example 3, it is evident that the additive for cement slurry containing 1 to 13.5 mol of propylene glycol as the dispersion stabilizer having a freezing point lowering function per 1000 g of water contained in the aqueous silica sol had favorable redispersibility even after storage at −20° C. and +50° C. as long as brought back to normal temperature. Furthermore, the amount of free water generated from the cement slurry was 0%. Thus, it is evident that an effect of suppressing the occurrence of free water was not impaired.

As shown in Example 4 to Example 6, it is evident that the additive for cement slurry containing 2 to 13.5 mol of methanol as the dispersion stabilizer having a freezing point lowering function per 1000 g of water contained in the aqueous silica sol generally had favorable redispersibility even after storage at −20° C. and +50° C. as long as brought back to normal temperature. Furthermore, the amount of free water generated from the cement slurry was generally 0%. Thus, it is evident that an effect of suppressing the occurrence of free water was not impaired.

As is evident from the results described above, the additive for cement slurry containing 1 to 30 mol of the dispersion stabilizer having a freezing point lowering function per 1000 g of the dispersion medium in the aqueous dispersion of silica is an additive for cement slurry that can be stored or preserved in a range of −30° C. to +60° C. and exerts an excellent effect of suppressing the occurrence of free water from cement slurry.

The invention claimed is:

1. An additive for cement slurry for a well, comprising:
an aqueous dispersion of colloidal silica particles having an average particle size of 3 to 200 nm by a dynamic light scattering method; and
a dispersion stabilizer consisting of at least one compound having an alcoholic hydroxyl group selected from the group consisting of methanol, ethanol, isopropyl alcohol, ethylene glycol, diethylene glycol, propylene glycol, and glycerin, optionally in combination with a water-soluble primary, secondary or tertiary amine, wherein
the additive for cement slurry for a well comprises 1 to 30 mol of the compound per 1000 g of a dispersion medium in the aqueous dispersion of the colloidal silica particles,
in the case of retaining the additive for cement slurry for a well at −20° C. for 48 hours and subsequently measuring an average particle size by the dynamic light scattering method at +20° C., the average particle size falls within a range of 1.0 to 7.0 times the initial average particle size before the retention, and
in the case of retaining the additive for cement slurry for a well at +50° C. for 7 days and subsequently measuring an average particle size by the dynamic light scattering method at +20° C., the average particle size falls within a range of 1.0 to 7.0 times the initial average particle size before the retention.

2. The additive for cement slurry for a well according to claim 1, wherein the at least one compound having an alcoholic hydroxyl group is at least one polyhydric alcohol selected from the group consisting of ethylene glycol, diethylene glycol, propylene glycol, and glycerin.

3. The additive for cement slurry for a well according to claim 1, wherein the at least one compound having an alcoholic hydroxyl group is propylene glycol.

4. The additive for cement slurry for a well according to claim 1, wherein the additive for cement slurry for a well comprises 1 to 25 mol of the compound having an alcoholic hydroxyl group per 1000 g of a dispersion medium in the aqueous dispersion of the colloidal silica particles.

5. The additive for cement slurry for a well according to claim 1, wherein the additive for cement slurry for a well comprises 1 to 20 mol of the compound having an alcoholic hydroxyl group per 1000 g of a dispersion medium in the aqueous dispersion of the colloidal silica particles.

6. The additive for cement slurry for a well according to claim 1, which comprises said water-soluble primary, secondary or tertiary amine as a dispersion stabilizer and an antifreezing agent.

7. A method for storing an additive for cement slurry for a well according to claim 1, comprising the step of
retaining the additive for cement slurry for a well in a liquid state in a temperature range of −30° C. to +60° C.

8. A method for storing an additive for cement slurry for a well according to claim 1, comprising the steps of:
freezing the additive for cement slurry for a well; and
thawing the frozen additive for cement slurry for a well, followed by redispersion.

9. A cement slurry for a well, comprising an additive according to claim 1, wherein
the cement slurry for a well comprises
0.1% to 10% BWOC of silica,
30 to 60% BWOC of water, and
0.03 to 3.0% BWOC of a dispersion stabilizer.

10. The cement slurry for a well according to claim 9, further comprising
0.1 to 5% BWOC of a cement hardening retarder, and
0.001 to 10% BWOC of at least one auxiliary agent selected from the group consisting of a dehydration regulator, an antifoamer, a hardening accelerator, a cement dispersant, a cement strength stabilizer, and a lost circulation material.

11. A cementing method for a well, comprising injecting cement slurry for a well according to claim 9 to a gap between a casing pipe inserted in the well and the stratum in boring of the well, followed by hardening.

* * * * *